US011959541B2

(12) United States Patent
Gallo et al.

(10) Patent No.: US 11,959,541 B2
(45) Date of Patent: Apr. 16, 2024

(54) COMPACT GEARED REDUCTION UNIT FOR APPLICATION WITH TRANSMISSION SHAFT SUBJECTED TO RADIAL LOADS

(71) Applicant: Comer Industries S.P.A., Reggiolo (IT)

(72) Inventors: Andrea Gallo, Reggio Emilia (IT); Federico Bindani, Correggio (IT)

(73) Assignee: COMER INDUSTRIES S.P.A., Reggiolo (IT)

( * ) Notice: Subject to any disclaimer, the term of this patent is extended or adjusted under 35 U.S.C. 154(b) by 0 days.

(21) Appl. No.: 17/772,554

(22) PCT Filed: Oct. 22, 2020

(86) PCT No.: PCT/EP2020/079777
§ 371 (c)(1),
(2) Date: Apr. 28, 2022

(87) PCT Pub. No.: WO2021/083789
PCT Pub. Date: May 6, 2021

(65) Prior Publication Data
US 2023/0012263 A1   Jan. 12, 2023

(30) Foreign Application Priority Data

Oct. 30, 2019   (IT) .................. 102019000020024

(51) Int. Cl.
*F16H 1/28* (2006.01)
*F03D 15/00* (2016.01)
(Continued)

(52) U.S. Cl.
CPC .......... *F16H 57/025* (2013.01); *F03D 15/00* (2016.05); *F16H 1/28* (2013.01); *F16H 57/021* (2013.01);
(Continued)

(58) Field of Classification Search
CPC ........ F16H 57/025; F16H 1/28; F16H 57/021; F16H 57/082; F03D 15/00
See application file for complete search history.

(56) References Cited

U.S. PATENT DOCUMENTS

| 3,352,178 A | 11/1967 | Lindgren et al. |
| 9,388,880 B2* | 7/2016 | Shizu ...................... E02F 9/123 |
| 2018/0283501 A1* | 10/2018 | Gallo ........................ F16H 1/28 |

FOREIGN PATENT DOCUMENTS

| CN | 105090450 B | 6/2017 |
| CN | 108644370 A | 10/2018 |
| EP | 2811625 A1 | 12/2014 |

OTHER PUBLICATIONS

Search Report dated Apr. 9, 2020 in IT Application No. 102019000020024.
(Continued)

*Primary Examiner* — Derek D Knight
(74) *Attorney, Agent, or Firm* — Panitch Schwarze Belisario & Nadel LLP

(57) ABSTRACT

A compact geared reduction unit for application with transmission shaft subjected to radial loads, comprising a box-like body inside which a gear system is accommodated for the transmission of rotary motion from a driving shaft to a transmission shaft, which is provided with an output reduction stage of the epicyclic type; the output reduction stage comprises a driving sun gear which rotates about a main axis and a ring gear which is integrally associated with the box-like body, between which multiple planet gears are engaged which are supported in rotation about respective longitudinal axes which are parallel to the main axis by a transmission planet carrier, which in turn rotates about the main axis and is associated so as to be integral in rotation with the transmission shaft at a connection region. The reduction unit furthermore provides for rolling means
(Continued)

adapted to support radial loads associated with the transmission shaft.

11 Claims, 6 Drawing Sheets

(51) Int. Cl.
    *F16H 57/021*     (2012.01)
    *F16H 57/025*     (2012.01)
    *F16H 57/029*     (2012.01)
    *F16H 57/08*     (2006.01)
    *F16H 57/02*     (2012.01)

(52) U.S. Cl.
    CPC ......... *F16H 57/029* (2013.01); *F16H 57/082* (2013.01); *F16H 2057/02073* (2013.01)

(56) References Cited

OTHER PUBLICATIONS

Int'l Search Report dated Feb. 26, 2021 in Int'l Application No. PCT/EP2020/079777.
Office Action issued Dec. 18, 2023 in EP Application No. 20792995.1.

* cited by examiner

COMPACT GEARED REDUCTION UNIT FOR APPLICATION WITH TRANSMISSION SHAFT SUBJECTED TO RADIAL LOADS

CROSS-REFERENCE TO RELATED APPLICATIONS

This application is a Section 371 of International Application No. PCT/EP2020/079777, filed Oct. 22, 2020, which was published in the English language on May 6, 2021 under International Publication No. WO 2021/083789 A1, and which claims priority under 35 U.S.C. § 119(b) to Italian Patent Application No. 102019000020024, filed on Oct. 30, 2019; and the disclosures of each application cited in this paragraph are incorporated herein by reference.

The present invention relates to a compact geared reduction unit for application with transmission shaft subjected to radial loads.

Geared reduction units are known which substantially comprise a casing for the containment of a gear system for transmitting the rotation between a driving shaft and a transmission shaft.

In particular, reduction units are known the gear system of which comprises at least one epicyclic output reduction stage constituted by a driving sun gear which rotates about a main axis and by a ring gear which is integral with the casing, between which multiple planet gears are engaged which are carried in rotation about their respective longitudinal axes which are parallel to the main axis by a transmission planet carrier, which in turn rotates about said main axis and is integrally associated in rotation with the transmission shaft.

If the reduction unit is of the multistage type, upstream of said epicyclic output reduction stage it is possible to provide one or more reduction stages in series, of the epicyclic type and/or with parallel axes.

The transmission shaft has at least one portion accommodated inside the casing that is supported in rotation by suitable rolling members, such as for example a pair of bearings, each one of which has the inner ring mounted on the transmission shaft and the outer ring accommodated in a corresponding seat formed within the casing. By means of an adjustment ring screwed onto the transmission shaft it is possible to adjust the preloading of the bearings.

In particular, for applications in which the transmission shaft is subjected not only to a bending moment but also to a radial load applied in a cantilevered manner, two bearings with conical rollers mounted in an O-shaped configuration (so-called back-to-back configuration) are generally used.

Typically, reduction units having one or more epicyclic reduction stages of the above described type are applied, for example, in the rotary actuation systems of the nacelles of wind turbines. In this case, the transmission shaft of the reduction unit is integral in rotation with a pinion which meshes with a toothed center bearing which is integral with said nacelle, and a radial load applied to the transmission shaft is generated in the coupling between said elements.

According to the above described configuration of components, the transmission shaft substantially has a portion accommodated inside the casing along which it is possible to identify, in axial direction, an end region for coupling with the planet carrier, a region for coupling with said adjustment ring, and a region for coupling with the two bearings.

This solution of the known type has some drawbacks, which includes the fact that according to the configuration described above the choice of the dimensions of the longitudinal extension of the portion of transmission shaft accommodated inside the casing and accordingly also that of said casing, which cannot be reduced below certain values in order to avoid compromising the strength of the reduction unit, penalizes its performance in terms of volumes, weight and costs.

In fact, as is known, the radial stress that bearings with conical rollers are capable of withstanding increases as the distance between them increases and as the distance between the largest of the bearings and the load application point decreases. For this reason, in choosing the dimensions of the reduction unit it is necessary to arrange one bearing proximate to the load application point and the other one at a distance sufficient to obtain the desired support.

As the cantilevered radial load applied to the transmission shaft increases, therefore, said distance and, consequently, the length of the portion of the transmission shaft to be accommodated inside the casing and the longitudinal volume of said casing also increase. The result, therefore, is an increase of the longitudinal volume and of the overall weight of the reduction unit, a higher production and logistics management cost both of the individual components (transmission shaft and casing) and of the entire reduction unit, complications in the assembly of the reduction unit in the machine in which it is intended to be applied and an increase in the quantity of lubricating oil introduced in the casing to lubricate the moving components.

The aim of the present invention is to eliminate the drawbacks mentioned above of the background art, devising a compact geared reduction unit for application with transmission shaft subjected to radial loads which allows to obtain a suitable rotational support of the transmission shaft even in the presence of radial loads applied in a cantilevered manner and, at the same time, to limit the longitudinal volume and the weight of the reduction unit.

Within this aim, an object of the present invention is to reduce the production and logistics management costs both of the components and of the entire reduction unit.

Another object of the present invention is to reduce the quantity of lubricating oil to be used in the reduction unit, so as to reduce further its weight and its operating costs.

Another object of the present invention is to be easier to apply and install inside the complex machines in which it is to be applied.

Another object of the present invention is to be versatile in use for the applications in which the transmission shaft is subjected to a cantilevered radial load, such as for example the rotary actuation units of the nacelles of wind turbines.

Another object of the present invention is to have a structure that is simple, relatively easy to provide in practice, safe in use, effective in operation, and of relatively low cost.

This aim and these and other objects that will become more apparent hereinafter are all achieved by a compact geared reduction unit for application with transmission shaft subjected to radial loads according to claim 1 and optionally provided with one or more of the characteristics according to the dependent claims.

Further characteristics and advantages of the present invention will become better apparent from the detailed description of a preferred but not exclusive embodiment, of a compact geared reduction unit for application with transmission shaft subjected to radial loads, illustrated by way of non-limiting example in the accompanying drawings, wherein.

Figure 1:
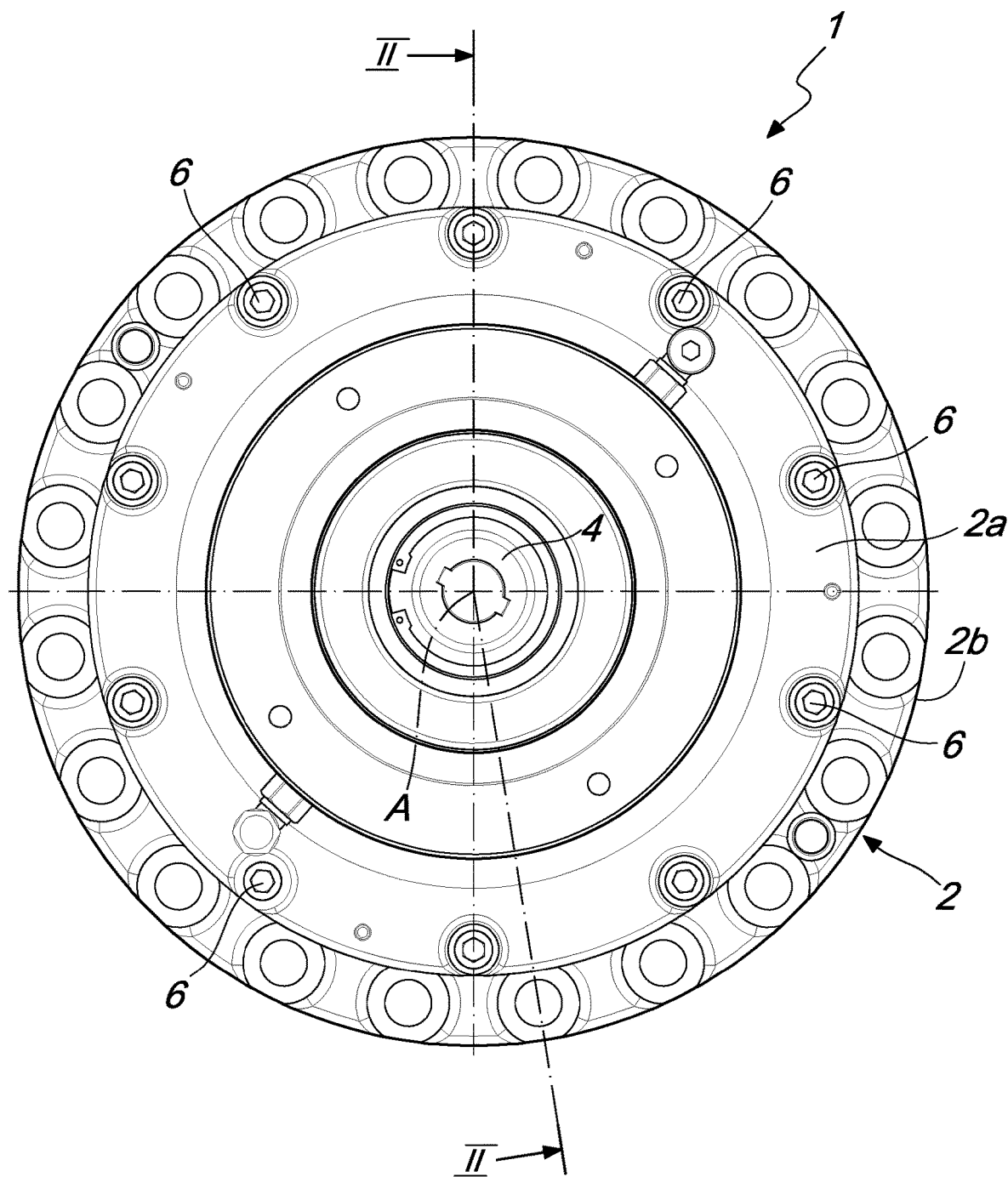
FIG. 1 is a front elevation view of a compact geared reduction unit for application with transmission shaft subjected to radial loads, according to the invention.
Figure 2:
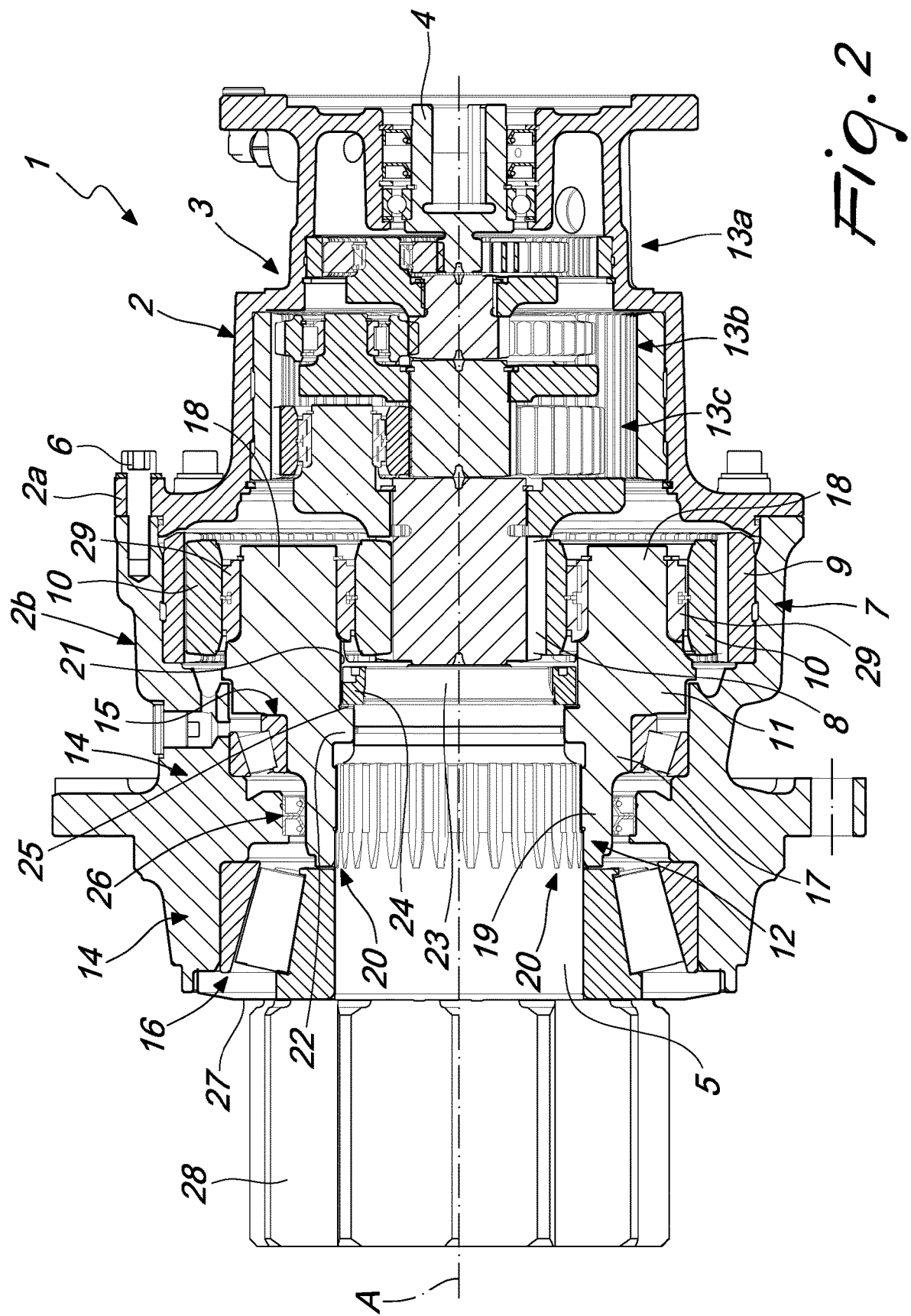
FIG. 2 is a sectional view of the reduction unit of FIG. 1, taken along the plane II-II.
Figure 3:
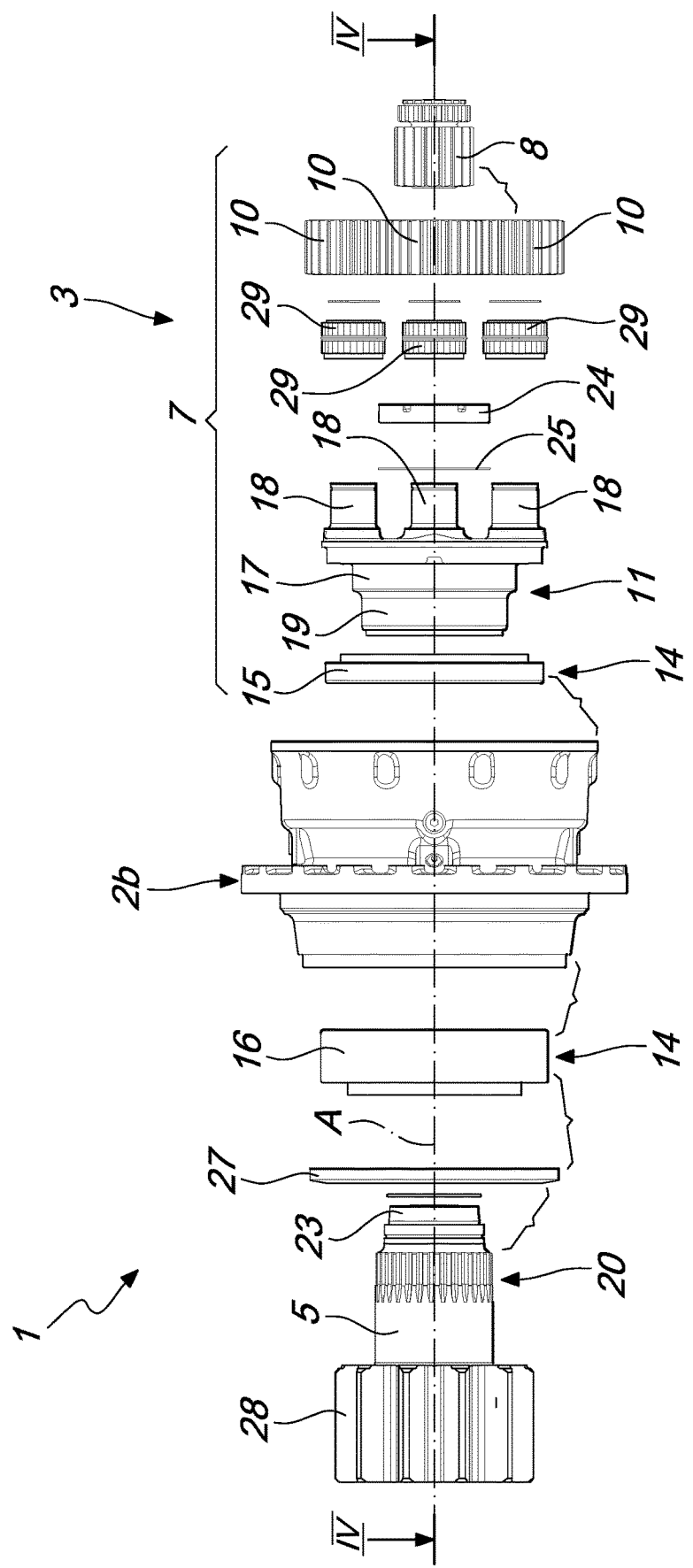
FIG. 3 is an exploded lateral elevation view of a portion of the reduction unit according to the invention.
Figure 4:
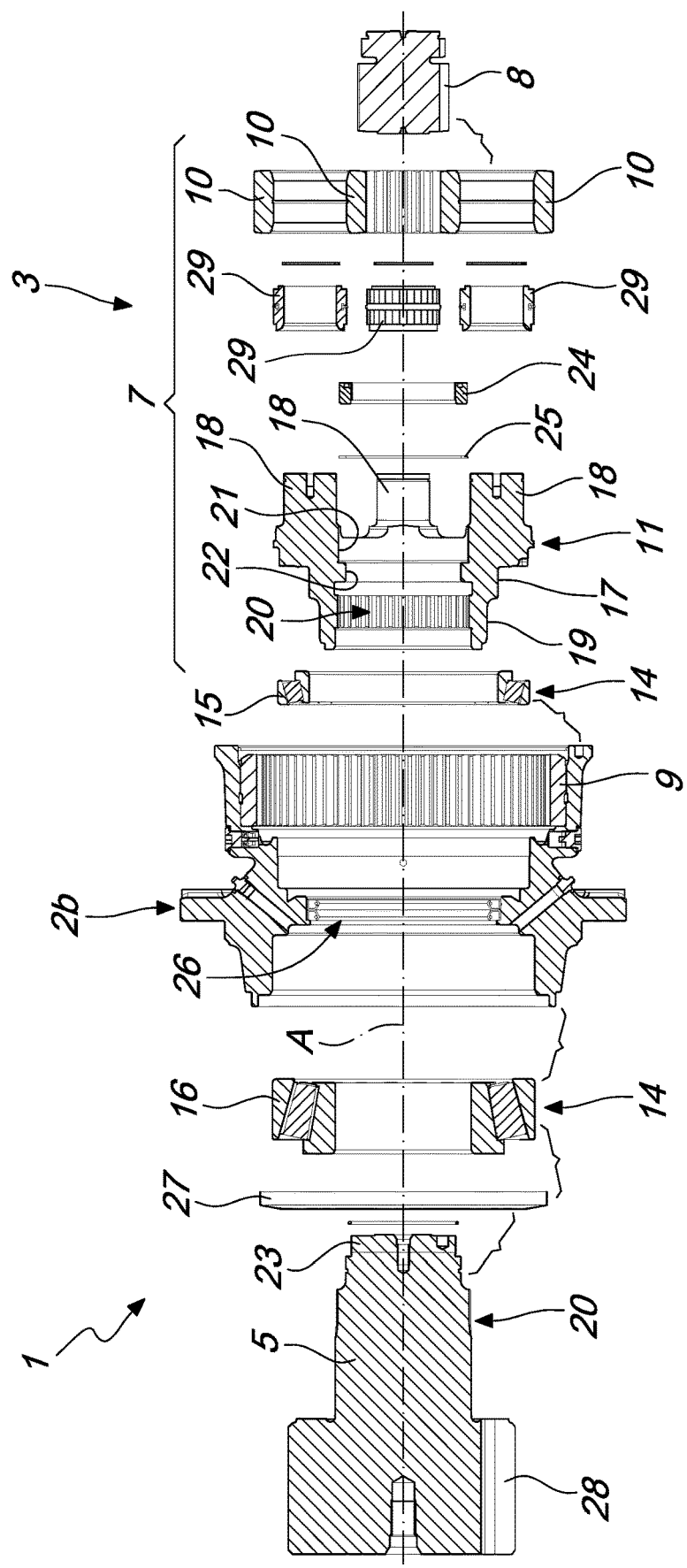
FIG. 4 is a sectional view of FIG. 3, taken along the plane Iv-Iv.
Figure 5:
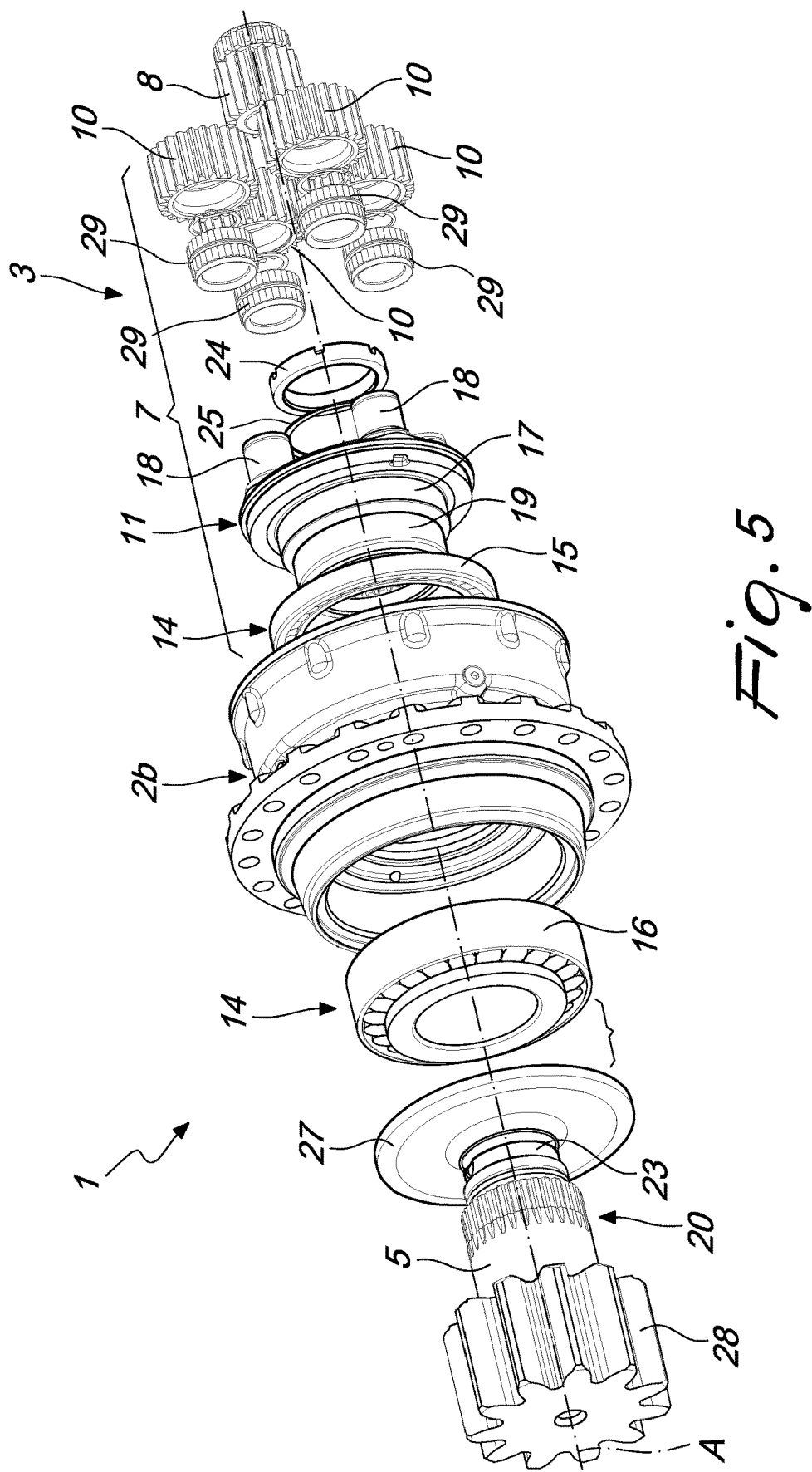
FIG. 5 is a perspective view of FIG. 3.
Figure 6:
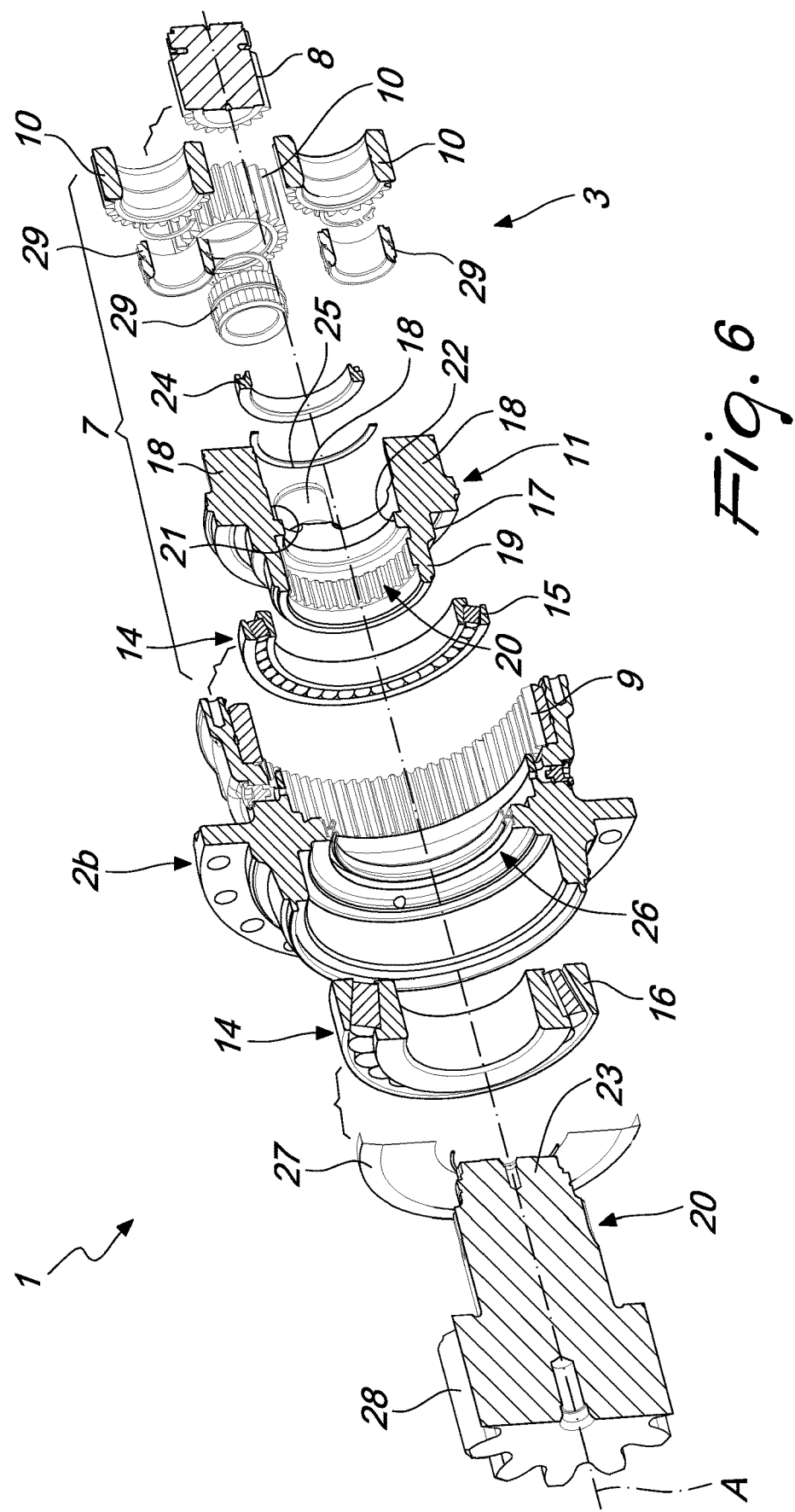
FIG. 6 is a perspective view of FIG. 4.

With particular reference to the figures, a compact geared reduction unit for application with transmission shaft subjected to radial loads is generally designated by the numeral 1.

The reduction unit 1 comprises a substantially box-like body 2 inside which a gear system 3 is accommodated for the transmission of rotary motion from a driving shaft 4 to a transmission shaft 5.

In the embodiment shown, the substantially box-like body 2 consists of two half-shells 2a and 2b connected by threaded members 6. It is not excluded that the substantially box-like body 2 might be otherwise shaped and be constituted by two or more components otherwise shaped and mutually coupled.

In use, the driving shaft 4 is adapted to be connected directly or indirectly to rotary actuation means such as a conventional electric or hydraulic motor.

The transmission shaft 5 has an end portion that protrudes outside the substantially box-like body 2 and is adapted to transmit the motion to a unit to be actuated rotationally.

In the embodiment shown, for example, the transmission shaft 5 is associated so as to be integral in rotation with a toothed pinion 28 at the end portion designed to couple with a corresponding toothed member of the unit to be actuated rotationally for motion transmission. The pinion 28 is, preferably, formed so as to be integral with the transmission shaft 5, but it is not excluded that they might be provided in two separate parts rendered integral at least in rotation about the main axis A by virtue of mechanical connection means.

The gear system 3 is provided with an output reduction stage 7 of the epicyclic type, which comprises a driving sun gear 8 which rotates about a main axis A and a ring gear 9 integrally associated with the substantially box-like body 2 and extended around said axis. Multiple planet gears 10 are engaged between the sun gear 8 and the ring gear 9 and are supported in rotation about respective longitudinal axes which are parallel to the main axis A by a transmission planet carrier 11, which in turn rotates about said main axis and is associated so as to be integral in rotation with the transmission shaft 5 at a connection region 12.

The number and arrangement of the planet gears 10 can vary in relation to the size of the output reduction stage 7 that is optimum for the specific application. In the embodiment shown, four planet gears 10 are provided which are angularly spaced in pairs by 90° around the main axis A.

In one possible embodiment the gear system 3 is of the single-stage type. In this case the output reduction stage 7 is interposed directly between the driving shaft 4 connected to the sun gear 8 and the transmission shaft 5 connected to the planet carrier 11.

As an alternative, the gear system 3 can be of the multistage type. In this case there are one or further reduction stages arranged in series between the driving shaft 4 and the output reduction stage 7. Said further reduction stages can be of the epicyclic type or with parallel axes.

In the embodiment shown in the figures, the gear system 3 is of the multistage type and provides for three further reduction stages 13a, 13b, 13c of the epicyclic type arranged in series between the driving shaft 4 and the output reduction stage 7.

The gear system 3 with the corresponding three further reduction stages 13a, 13b, 13c of the epicyclic type is not described in detail, since it is of a type known to the person skilled in the art.

In this case, the driving shaft 4 and the transmission shaft 5 are aligned along the main axis A. It is not excluded, however, that the driving shaft 4 and the transmission shaft 5 might be parallel, but not aligned (if the gear system comprises one or more further reduction stages with parallel axes), i.e., at right angles or oblique to each other.

The reduction unit 1 comprises, moreover, rolling means 14 adapted to bear radial loads associated with the transmission shaft 5 for the rotational guiding thereof.

The rolling means 14 comprise a first radial bearing 15, which is interposed in a radial direction between the substantially box-like body 2 and the planet carrier 11, and a second radial bearing 16, which is interposed radially between the body and the transmission shaft 5, the first and second bearings 15 and 16 being arranged axially on opposite sides of the connection region 12.

In the embodiment shown, the first and second bearings 15 and 16 are of the type of radial bearings with conical rollers mounted in an O-shaped configuration (so-called back-to-back configuration). As an alternative, they might be, for example, of the type of radial bearings with cylindrical rollers, radial needle roller bearings, radial spherical roller bearings, radial toroidal roller bearing or radial ball bearings.

The particular arrangement of the first and the second bearings 15 and 16 allows to arrange the second bearing 16 proximate to the region of application of the radial load and to maintain an adequate distance in an axial direction between said bearings so as to obtain an optimum support of the transmission shaft 5, but with a reduced axial volume of the transmission shaft and of the substantially box-like body 2 with respect to known solutions.

In this manner, the planet carrier 11 of the output reduction stage 7 also cooperates in supporting the transmission shaft 5.

In greater detail, the planet carrier 11 comprises a flange 17 which is extended around the main axis A and from which multiple pivots 18 for rotationally supporting respective planet gears 10 protrude in an axial direction on one side and a hub 19 for connection to the transmission shaft 4 which defines the connection region 12 protrudes on the other side.

In the embodiment shown, four pivots 18 are provided which are angularly spaced in pairs by 90° around the main axis A.

A conventional bearing 29, for example of the roller type, is interposed between each pivot 18 and the corresponding planet gear 10.

The planet carrier 11 has, therefore, a so-called configuration with cantilevered supported pivots 18.

The hub 19 and the transmission shaft 5 are associated so as to be integral in rotation about the main axis A by virtue of connection means with splined profiles 20 provided at the connection region 12. However, alternative methods of mechanical connection of the hub 19 and the transmission shaft 5 known to the person skilled in the art are not excluded.

The first bearing 15 is associated with the planet carrier 11 externally to the flange 17. The inner ring of the first bearing 15 is, therefore, keyed on the outer side wall of the flange 17.

The flange 17 is provided with an axial hole 21 which extends along the main axis A and is provided internally with an annular protrusion 22 which protrudes toward said axis.

The transmission shaft 5 is provided with an end shank 23 which is accommodated along the hole 21 and protrudes beyond the protrusion 22 inside the substantially box-like body 2.

An adjustment ring 24 is also provided which is coupled to the shank 23 and is adapted to abut in an axial direction against the protrusion 22 in order to adjust the preloading of the bearings 15 and 16.

The ring 24 is internally threaded and is coupled with a corresponding female thread formed on the cylindrical side wall of the shank 23.

Furthermore, one or more rings 25 with calibrated thickness can be provided which are interposed in an axial direction between the ring 24 and the protrusion 22 in order to obtain the desired preloading of the bearings 15 and 16.

Furthermore, in the embodiment shown there are hydraulic sealing means 26 of a known type which are interposed in a radial direction between the hub 19 and the substantially box-like body 2, in order to insulate the portion of the internal cavity of the body that accommodates the gear system 3 and the first bearing 15 and in which lubrication with oil of the moving members is provided, and a closure and sealing ring 27 of the Nilos type which is clamped between the transmission shaft 5, the second bearing 16 and the substantially box-like body 2, in order to limit the portion of the internal cavity of said body in which the second bearing 16 is accommodated and in which there is grease lubrication of the moving members.

It is not excluded that oil lubrication of all the moving members accommodated inside the substantially box-like body 2 might be provided, and therefore the hydraulic sealing means 26 might be otherwise shaped and positioned.

In particular, the reduction unit 1 can be applied in a unit for the rotary actuation about a vertical axis of the nacelle of a wind power mast, not shown.

In this case, the reduction unit 1 constitutes a component of a complex machine and is installed with the main axis arranged vertically and with the pinion 28 arranged in an upper region and coupled with a toothed center bearing which is integral with the nacelle to be rotationally actuated.

In this case, the radial load applied to the transmission shaft 5 originates from the reaction of the coupling between the pinion 28 and the center bearing. However, alternative uses of the reduction unit 1 are not excluded in applications in which a radial load applied to the transmission shaft 5 is provided, such as for example units for the rotary actuation of cabs or accessories of work vehicles, such as baskets, cranes, concrete pumps, stationary cement mixers, stationary cranes, mobile cranes, mixer trucks, slurry mixers, mixers for biogas plants, mining machines, shredders or rolling mills.

In practice it has been found that the described invention achieves the intended aim and in particular it is noted that the reduction unit according to the invention allows to obtain a suitable rotary support of the transmission shaft even in the presence of radial loads and to contain the axial extension of the shaft, of the substantially box-like body in which it is partially accommodated and, therefore, of the reduction unit as a whole.

Accordingly, the reduction unit according to the invention also has a low weight and therefore is easier to use and move, and also has lower production and operating costs and a lower consumption of lubricating oil than known solutions.

Moreover, the reduction unit according to the invention is versatile in use and can be configured and sized according to the requirements of the specific application.

The invention thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to the requirements without thereby abandoning the protective scope of the claims that follow.

The disclosures in Italian Patent Application No. 102019000020024 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

We claim:

1. A compact geared reduction unit for application with transmission shaft subjected to radial loads, comprising:
    an accommodation body,
    a gear system accommodated inside said accommodation body,
    a driving shaft,
    a transmission shaft,
    an output reduction stage of the epicyclic type which comprises a driving sun gear which rotates about a main axis and a ring gear which is integrally associated with said accommodation body, between which multiple planet gears are engaged which are supported in rotation about respective longitudinal axes which are parallel to said main axis by a transmission planet carrier, which in turn rotates about said main axis and is connected so as to be integral in rotation with said transmission shaft at a connection region, such that rotary motion is transmitted from said driving shaft to said transmission shaft, and
    rolling means comprising a first radial bearing which is arranged interposed in a radial direction between said accommodation body and said planet carrier and a second radial bearing which is arranged radially between said accommodation body and said transmission shaft, the first and second radial bearings being arranged axially on opposite sides of said connection region such that said rolling means being adapted to support radial loads subjected to said transmission shaft for the rotational guiding of said transmission shaft.

2. The reduction unit according to claim 1, wherein said planet carrier comprises a flange which is arranged extended around said main axis and from which multiple pivots for rotationally supporting respective said planet gears protrude in an axial direction on one side and a hub connected to said transmission shaft which defines said connection region protrudes on another side.

3. The reduction unit according to claim 2, wherein said hub and said transmission shaft are mutually connected so as to be integral in rotation about said main axis by connection means with splined profiles.

4. The reduction unit according to claim 2, wherein said first radial bearing is connected with said planet carrier externally to said flange.

5. The reduction unit according to claim 2, wherein said flange is provided with an axial hole which extends along said main axis and is provided internally with an annular protrusion which protrudes toward said axis and wherein said transmission shaft comprises a shank which is accommodated along said axial hole and protrudes beyond said annular protrusion, the reduction unit further comprising an adjustment ring coupled to said shank so as to abut in an axial direction against said annular protrusion.

6. The reduction unit according to claim 5, further comprising at least one ring interposed in an axial direction between said adjustment ring and said annular protrusion.

7. The reduction unit according to claim 2, further comprising hydraulic sealing means interposed in a radial direction between said hub and said accommodation body and arranged in an axial direction between said first and second radial bearings.

8. The reduction unit according to claim 2, further comprising a closure and sealing ring which is clamped between said transmission shaft, said second radial bearing and said accommodation body.

9. The reduction unit according to claim 1, wherein said first and second radial bearings are selected from a group comprising: radial bearings with conical rollers mounted in an O-shaped configuration, radial bearings with cylindrical rollers, radial needle roller bearings, radial spherical roller bearings, radial toroidal roller bearings, radial ball bearings.

10. The reduction unit according to claim 1, wherein said transmission shaft comprises a toothed pinion which is integrally connected in rotation about the main axis with said transmission shaft and is arranged outside said accommodation body.

11. The reduction unit according to claim 1, wherein said gear system comprises at least one further reduction stage which is interposed between said driving shaft and said output reduction stage, the at least one further reduction stage being an epicyclic reduction stage or a reduction stage with parallel axes.

* * * * *